United States Patent [19]

Liebe

[11] 3,936,681

[45] Feb. 3, 1976

[54] COOLING ARRANGEMENT FOR ELECTRIC GENERATORS OF UNDERWATER POWER PLANTS

[75] Inventor: Wolfgang Liebe, Berlin, Germany

[73] Assignee: Siemens Aktiengesellschaft, Munich, Germany

[22] Filed: Nov. 16, 1973

[21] Appl. No.: 416,522

[30] Foreign Application Priority Data

Dec. 4, 1972 Germany............................ 2259738

[52] U.S. Cl. ...................... 310/54; 310/64; 310/87; 290/52; 165/107; 165/181
[51] Int. Cl.² .......................................... H02K 9/00
[58] Field of Search.................... 165/107, 179, 181; 122/367 R, 367 C; 310/64, 87, 54; 290/52

[56] References Cited
UNITED STATES PATENTS

| 1,373,002 | 3/1921 | Hellmund .............................. 310/64 |
| 2,634,375 | 4/1953 | Guimbal ................................ 310/87 |
| 3,476,180 | 11/1969 | Straight, Jr. et al. ............ 122/367 R |

FOREIGN PATENTS OR APPLICATIONS

| 1,022,783 | 12/1952 | France................................ 165/107 |
| 737,990 | 10/1955 | United Kingdom................. 165/179 |
| 1,218,050 | 6/1966 | Germany ............................... 310/87 |
| 1,280,392 | 10/1968 | Germany ............................... 310/64 |

Primary Examiner—Albert W. Davis, Jr.
Assistant Examiner—James D. Liles
Attorney, Agent, or Firm—Kenyon & Kenyon Reilly Carr & Chapin

[57] ABSTRACT

A cooling arrangement is provided for an electric generator of an underwater power plant contained in a body wherein a coolant is circulated for cooling the generator. The cooling arrangement includes a cowl that covers the end-face of the generator and forms a portion of the body. The outer surface of the cowl is exposed to the turbine water and the inner surface of the cowl defines a path for conducting the coolant therealong for recooling the coolant. A plurality of cooling fins are provided and each of the fins has two end-portions bent toward each other to give the fin a hook-like configuration. Each fin is fixedly mounted to the inner surface of the cowl at one of the end-portions thereof. The fins are short relative to the length of the path.

9 Claims, No Drawings

COOLING ARRANGEMENT FOR ELECTRIC GENERATORS OF UNDERWATER POWER PLANTS

BACKGROUND OF THE INVENTION

The invention relates to a cooling arrangement for electric generators of underwater power plants.

In an underwater power plants, the electric generators are situated in the interior of a hollow steel body of generally streamlined configuration. The body includes a portion which can be called the cowl. The cowl covers the generator on the end-side face thereof. The generators are cooled by forced circulation of a coolant in the housing of the generator, for example, air and/or water. The circulating coolant is conducted along the inside surface of the cowl for recooling by the cold turbine water flowing on the outside. The cowl thereby serves as a heat exchanger between the warmed-up coolant and the cold turbine water flowing outside the body.

In order to achieve the most intensive recooling possible, the best possible heat transfer must be obtained from the coolant to the wall of the cowl. It is known from French Pat. No. 1,022,783 to provide the cowl for this purpose with cooling fins on the surface facing the coolant. Because of the curved shape of the cowl, however, difficulties arise regarding the attachment of the cooling fins at the cowl because of their length.

SUMMARY OF THE INVENTION

It is an object of the invention to simplify the fabrication of a cowl of the above-mentioned kind provided with cooling fins without detrimentally affecting thereby the good heat transfer between the coolant and the cowl.

The cooling arrangement of the invention is suitable for an electric generator of an underwater power plant contained in a body wherein a coolant is circulated for cooling the generator. The cooling arrangement includes as a feature a cowl that covers the end-face of the generator and forms a portion of the body. The outer surface of the cowl is exposed to the turbine water and the inner surface of the cowl defines a path for conducting the coolant therealong for recooling the coolant. A plurality of cooling fins are provided and each of the fins has two end-portions bent toward each other to give the fin a hook-like configuration. Each of the fins is fixedly mounted to the inner surface of the cowl at one of the end-portions thereof. The fins are short relative to the length of the path.

By using short fins, the influence of the cowl curvature on the attachment of the fins is reduced. Furthermore, the boundary layer which forms at each fin with respect to the flowing coolant remains relatively thin, so that good heat transfer is obtained. Because of the hook shape of the short cooling fins, the surface of the fins is furthermore increased without a corresponding need to make the flow canal for the coolant higher. Specifically, it is desirable to keep the flow canal low so that with a given power rating of the device providing the coolant flow, such as a blower, a high flow velocity in the canal and thereby, a large through-put of coolant can be obtained. The advantage of the hook-shaped cooling fins is therefore that in a low flow canal large fin areas can be realized with a small number of fins. This ensures good heat transfer while also simplifying the fabrication because the number of the short fins is reduced. Such an effective system of fins is particularly important if pressurized air is used as the coolant, as this increases the specific transfer capacity considerably.

The cooling fins can be arranged one behind the other in flow direction. According to a preferred subsidiary embodiment of the invention, each succeeding fin is displaced with respect to the preceding fin thereby staggering the fins. This enables a particularly good heat transfer to be achieved.

The plurality of cooling fins can be arranged into a plurality of groups one behind the other in the direction of coolant flow, the fins of each group being displaced relative to the fins of the immediate preceding group.

The above-mentioned heat transfer can be improved still further by making the cooling fins of a particularly good heat-conducting material, such as copper. Copper has the further advantage that it is suited for attachment to steel surfaces by simple manufacturing processes, for example by soldering.

Although the invention is illustrated and described herein as a cooling arrangement for electric generators of underwater power plants, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
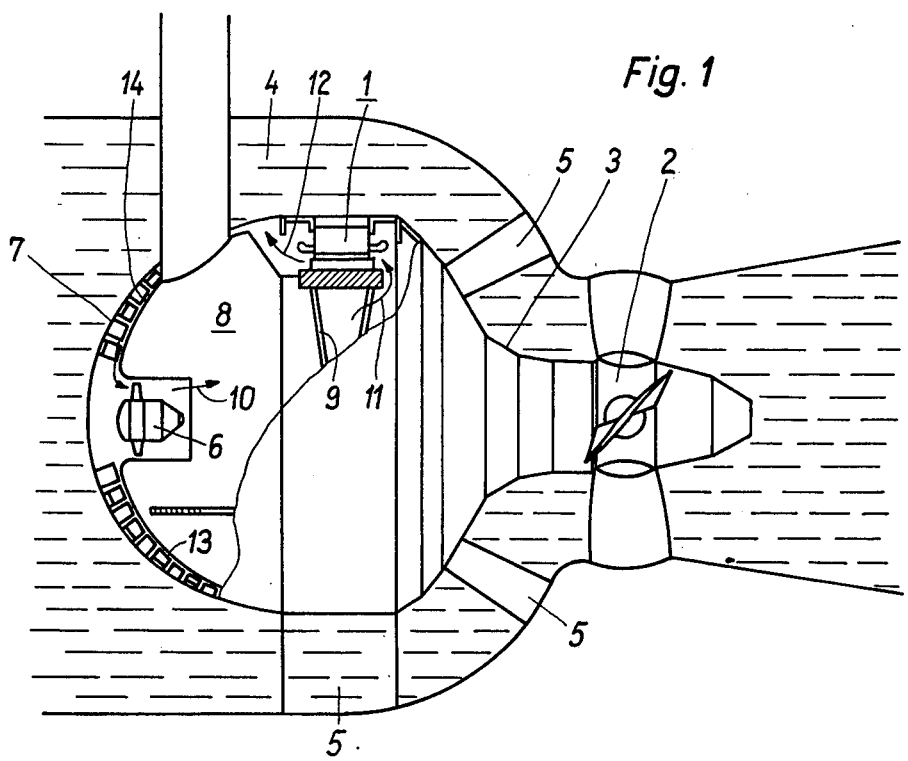
FIG. 1 is a broken-out perspective view of an underwater power plant showing the arrangement and assembly of the machine components contained therein. In particular are shown the electric generator and the cooling arrangement therefor according to the invention.

Referring to FIG. 1, the generator 1 of an underwater hydraulic power plant is accommodated together with the turbine 2, in a housing 3 of streamlined configuration in the turbine water canal 4. The housing 3 is held in its position by supports 5. Turbine water flows on all sides of the housing 3.

For cooling the generator 1, air is used as the coolant and circulates within the housing 3 in a coolant circulation loop established by the forcing action of a blower 6. The blower 6 is located on the longitudinal axis of the housing 3 in the proximity of the cowl 7 which covers the generator 1 on the end-face side and forms part of the housing 3. The coolant is driven by the blower 6 through the space 8 provided for the maintenance of the generator 1 toward the pole wheel 9 of the generator 1 as indicated by the arrow 10. It is conducted through the hub spider of the pole wheel 9 (see arrow 11) and deflected, and then flows between the poles of the wheel 9 and thereby cools the excitation winding of the generator 1 as well as the end-turns of the stator winding. Then, the coolant is conducted, according to the arrow 12, into a flow canal 14 formed between the inner casing 13 of the housing 3 and the cowl 7.

Figure 2:
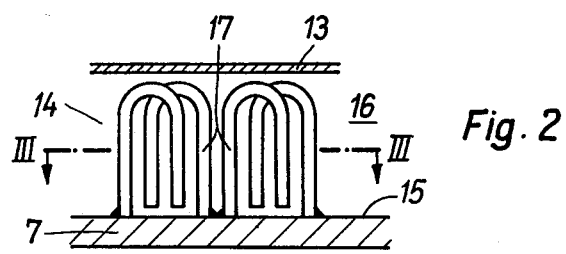
FIG. 2 is a section view perpendicular to the direction of the coolant flow along the cowl. This view shows the cooling fins of the cooling arrangement of the invention arranged parallel to the direction of flow.

The coolant flows along the inside wall of the cowl 7 which, in turn, is surrounded by the flow of the turbine water and is cooled thereby. The coolant transfers the heat absorbed from the active parts of the generator 1 to the cowl 7. Referring to FIG. 2, the cooling surface 15 of the cowl 7 facing the coolant is enlarged by the cooling fins 16. The cowl thus serves as a heat exchanger between the heated coolant and the cold turbine water which is used as the recooling medium.

Figure 3:
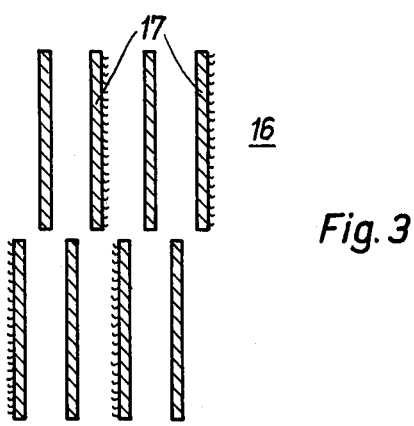
FIG. 3 is a section view of the cooling fins taken along the line III—III of FIG. 2.

The individual cooling fins 16 consist of hook-shaped plates, for instance of copper, bent so that the legs are of different length, the longer of which, 17, is fastened at the cowl 7. The length of the cooling fins 16 is short relative to the flow path of the coolant. The cooling fins are disposed parallel to the direction of flow. Cooling fins 16 situated behind each other are arranged here in a staggered manner, (FIG. 3) so that the best possible heat transfer is achieved. The surface area of each individual cooling fin is increased substantially by the hook-like configuration without the necessity of making the height of the flow canal 14 large; this enables a high flow-velocity of the coolant to be achieved, and thereby, a good heat transfer to the cowl 7. The number of cooling fins 16 is kept as small as possible consistent with good heat transfer thereby simplifying the fabrication of the cowl 7.

What is claimed is:

1. In an underwater electric generator contained in a body wherein coolant is circulated for cooling the generator, a cooling arrangement including a cowl covering the end-face of the generator and forming a portion of the body, the outer surface of the cowl being exposed to the turbine water and the inner surface of the cowl defining an arcuate path for conducting the coolant therealong for recooling the coolant, the improvement in said cooling arrangement comprising: a plurality of cooling fins, each of the fins being made from a flat member and having two end-portions bent toward each other to give the fin a hook-like configuration, each of the fins being fixedly mounted to the inner surface of the cowl at one of said end-portions thereof and being short relative to the length of the path.

2. The cooling arrangement of claim 1, said cooling fins being arranged with their flat surfaces parallel to the direction of flow of the coolant.

3. The cooling arrangement of claim 1, said cooling fins being arranged one behind the other in the direction of the flow of the coolant, each succeeding fin being displaced with respect to the preceding fin.

4. The cooling arrangement of claim 3, said cooling fins being arranged parallel to the direction of flow of the coolant.

5. The cooling arrangement of claim 1, said cooling fins being arranged into a plurality of groups one behind the other, the cooling fins of each of the groups being displaced relative to the cooling fins of the immediate preceding group of cooling fins.

6. The cooling arrangement of claim 5, said cooling fins being arranged parallel to the direction of flow of the coolant.

7. The cooling arrangement of claim 1, the end-portions of each of said cooling fins defining respective leg portions of the fin, one of said leg portions being longer than the other one of said leg portions, said longer leg portions being fixedly attached to the cowl.

8. The cooling arrangement of claim 1, said cooling fins being made of a material having good heat conductive quality.

9. The cooling arrangement of claim 8 wherein said cooling fins are made of copper.

* * * * *